(12) United States Patent
Kaseda et al.

(10) Patent No.: US 10,596,514 B2
(45) Date of Patent: Mar. 24, 2020

(54) ACID-GAS CAPTURING APPARATUS AND ACID GAS CAPTURING METHOD

(71) Applicant: KABUSHIKI KAISHA TOSHIBA, Minato-ku (JP)

(72) Inventors: Tetsuya Kaseda, Kawasaki (JP); Koshito Fujita, Yokohama (JP); Mitsuru Udatsu, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 64 days.

(21) Appl. No.: 15/634,679

(22) Filed: Jun. 27, 2017

(65) Prior Publication Data
US 2018/0001253 A1 Jan. 4, 2018

(30) Foreign Application Priority Data

Jun. 30, 2016 (JP) .................................. 2016-130744

(51) Int. Cl.
*B01D 53/18* (2006.01)
*B01D 53/14* (2006.01)

(52) U.S. Cl.
CPC ..... *B01D 53/1425* (2013.01); *B01D 53/1475* (2013.01); *B01D 53/18* (2013.01); *B01D 2252/204* (2013.01)

(58) Field of Classification Search
None
See application file for complete search history.

(56) References Cited

U.S. PATENT DOCUMENTS

| | | | |
|---|---|---|---|
| 6,784,320 B2 | 8/2004 | Mimura et al. | |
| 6,883,327 B2 | 4/2005 | Iijima et al. | |
| 8,920,548 B2 * | 12/2014 | Hokari | B01D 53/62 96/244 |
| 9,050,555 B2 | 6/2015 | Iijima | |
| 9,157,353 B2 | 10/2015 | Hodotsuka et al. | |
| 9,421,491 B2 | 8/2016 | Tsujiuchi et al. | |
| 2013/0336867 A1 | 12/2013 | Hodotsuka et al. | |
| 2016/0001223 A1 | 1/2016 | Okuno et al. | |

FOREIGN PATENT DOCUMENTS

| | | |
|---|---|---|
| CN | 103446848 | 12/2013 |
| JP | 2002-126439 | 5/2002 |
| JP | 2004-323339 | 11/2004 |
| JP | 2012-223661 | 11/2012 |
| JP | 2013-59727 | 4/2013 |
| JP | 2014-004578 | 1/2014 |
| WO | WO 2014/175338 A1 | 10/2014 |

* cited by examiner

*Primary Examiner* — Tam M Nguyen

(74) *Attorney, Agent, or Firm* — Oblon, McClelland, Maier & Neustadt, L.L.P.

(57) ABSTRACT

An acid-gas capturing apparatus according to an embodiment includes an absorption unit configured to discharge an absorption-unit exhaust gas, and a regeneration unit configured to discharge a regeneration unit exhaust gas. The regeneration unit exhaust gas is compressed in a compression unit. The absorption-unit exhaust gas or the regeneration unit exhaust gas before it is compressed by the compression unit is cleaned in a first cleaning unit by means of a first cleaning liquid. A compression-condensate liquid, which is generated by the compression of the regeneration unit exhaust gas in the compression unit, is mixed into the first cleaning liquid through a first compression-condensate-liquid line whose one end is connected to the compression unit.

4 Claims, 3 Drawing Sheets

ACID-GAS CAPTURING APPARATUS AND ACID GAS CAPTURING METHOD

CROSS-REFERENCE TO RELATED APPLICATIONS

This application is based upon and claims the benefit of priority from Japanese Patent Application No. 2016-130744, filed Jun. 30, 2016; the entire contents of which are incorporated herein by reference.

FIELD

Embodiments described herein relate generally to an acid-gas capturing apparatus and an acid-gas capturing method.

BACKGROUND

Plant exhaust gases discharged from plants such as thermal plants or steel plants contain carbon dioxide ($CO_2$) which brings about the greenhouse effect. Thus, to allow such plant exhaust gases to discharge into the atmospheric air is considered to be one of the causes of global warming.

As effective countermeasures against the global warming, a CCS (Carbon dioxide Capture and Storage) system that separates carbon dioxide from a plant exhaust gas and captures the separated carbon dioxide is known, for example. This system uses an absorbing liquid capable of absorbing carbon dioxide, and causes carbon dioxide contained in a plant exhaust gas to be absorbed by the absorbing liquid.

To be more specific, the carbon dioxide capture and storage system includes an absorption unit and a regeneration unit. The absorption unit brings the plant exhaust gas and the absorbing liquid into gas-liquid contact with each other, and causes carbon dioxide in the plant exhaust gas to be absorbed by the absorbing liquid. The regeneration unit heats the absorbing liquid having absorbed the carbon dioxide to cause the carbon dioxide to be released from the absorbing liquid, and captures the released carbon dioxide. The captured carbon dioxide is stored in the ground and so on. Thus, emission of carbon dioxide into the atmospheric air is reduced.

In order to efficiently absorb mild acidic carbon dioxide, alkaline amine solution is preferably used as an absorbing liquid. Thus, when a plant exhaust gas contains hydrogen sulfide ($H_2S$), carbonyl sulfide (COS), carbon disulfide ($CS_2$) and hydrogen cyanide (HCN) which are acid gases other than carbon dioxide, these acid gases can be also absorbed.

The plant exhaust gas from which carbon dioxide has been removed in the absorption unit is discharged, as an absorption-unit exhaust gas, from the absorption unit. When the absorption-unit exhaust gas is discharged from the absorption unit, an absorbing liquid component is entrained with the absorption-unit exhaust gas. Thus, there is concern over the diffusion of the absorbing liquid component into the atmospheric air, which exerts harmful effects on neighboring environments.

For this reason, a cleaning unit, which cleans the absorption-unit exhaust gas discharged from the absorption unit by means of cleaning water (e.g., deionized water), can be installed. In this case, the absorption-unit exhaust gas and the cleaning water make gas-liquid contact with each other, and the absorbing liquid component in the absorption-unit exhaust gas is captured by the cleaning water, whereby the absorbing liquid component can be removed from the absorption-unit exhaust gas. The cleaning water circulates in the cleaning unit, and the cleaning of the absorption-unit exhaust gas is continuously carried out. This cleaning unit may also clean a regeneration unit exhaust gas discharged from the regeneration unit.

However, since the cleaning water continuously cleans absorption-unit exhaust gas in the cleaning unit, the absorbing liquid component is accumulated in the cleaning water, which may result in lowering of cleaning effect of the cleaning water. Thus, a part of the cleaning water is continuously replaced with a new liquid (deionized water, etc.) for making up the cleaning water. In this case, the part of the cleaning water in which the absorbing liquid component is accumulated is extracted and discarded, the amount of which corresponds to the made-up cleaning water. Thus, an amount of a new liquid to be used for making up the cleaning water increases, as well as an amount of the cleaning water to be discarded increases, which invites increase in operating cost.

In order to handle these situations, there is known a method in which condensate water generated upon cooling of the regeneration unit exhaust gas discharged from the regeneration unit is used as the cleaning water. Namely, the condensate water can be used as an alternative to deionized water to be used as the cleaning liquid, whereby the amount of use of the deionized water can be reduced. In addition, since the regeneration unit exhaust gas contains carbon dioxide, the condensate water obtained therefrom is mild acidic to have a smaller pH value. Thus, a higher cleaning effect can be expected as compared with the cleaning by means of deionized water.

However, since the regeneration unit exhaust gas also contains the absorbing liquid component, the condensate water condensed from the regeneration unit exhaust gas contains an alkali absorbing liquid component. Thus, the pH in the condensate water comes close to neutral, which limits the improvement in capturing efficiency of the absorbing liquid component in the absorption-unit exhaust gas.

DETAILED DESCRIPTION

An acid-gas capturing apparatus according to the embodiments includes an absorption unit configured to cause an acid gas contained in a plant exhaust gas to be absorbed an absorbing liquid, and to discharge the plant exhaust gas as an absorption-unit exhaust gas, and a regeneration unit configured to cause the acid gas to be released from the absorbing liquid having absorbed the acid gas, and to discharge the acid gas as a regeneration unit exhaust gas. The regeneration unit exhaust gas is compressed in a compression unit. The absorption-unit exhaust gas or the regeneration unit exhaust gas before it is compressed by the compression unit is cleaned in a first cleaning unit by means of a first cleaning liquid. Compression-condensate liquid, which is generated by the compression of the regeneration unit exhaust gas in the compression unit, is mixed into the first cleaning liquid through a first compression-condensate-liquid line whose one end is connected to the compression unit.

In addition, an acid-gas capturing method according to this embodiment includes absorbing an acid gas contained in a plant exhaust gas to an absorbing liquid and discharging the plant exhaust gas as an absorption-unit exhaust gas; and releasing the acid gas from the absorbing liquid having absorbed the acid gas in the absorbing and discharging the acid gas as a regeneration unit exhaust gas. In addition, the acid-gas capturing method includes compressing, in a compression unit, the regeneration unit exhaust gas discharged in the releasing and mixing a compression-condensate liquid which has been generated in the compressing and discharged from the compression unit, into a first cleaning liquid. The absorption-unit exhaust gas or the regeneration unit exhaust gas before it is compressed in the compressing is cleaned by the first cleaning liquid with the compression-condensate liquid being mixed thereinto.

The acid-gas capturing apparatus and the acid-gas capturing method according to the embodiments of the present invention are described herebelow with reference to the drawings.

First Embodiment

The acid-gas capturing apparatus and the acid-gas capturing method according to a first embodiment of the present invention are described with reference to FIG. 1. In this embodiment, as an example of the acid-gas capturing method, a carbon-dioxide capturing apparatus that captures carbon dioxide from a plant exhaust gas containing carbon dioxide (an example of acid gas) is described.

Figure 1:
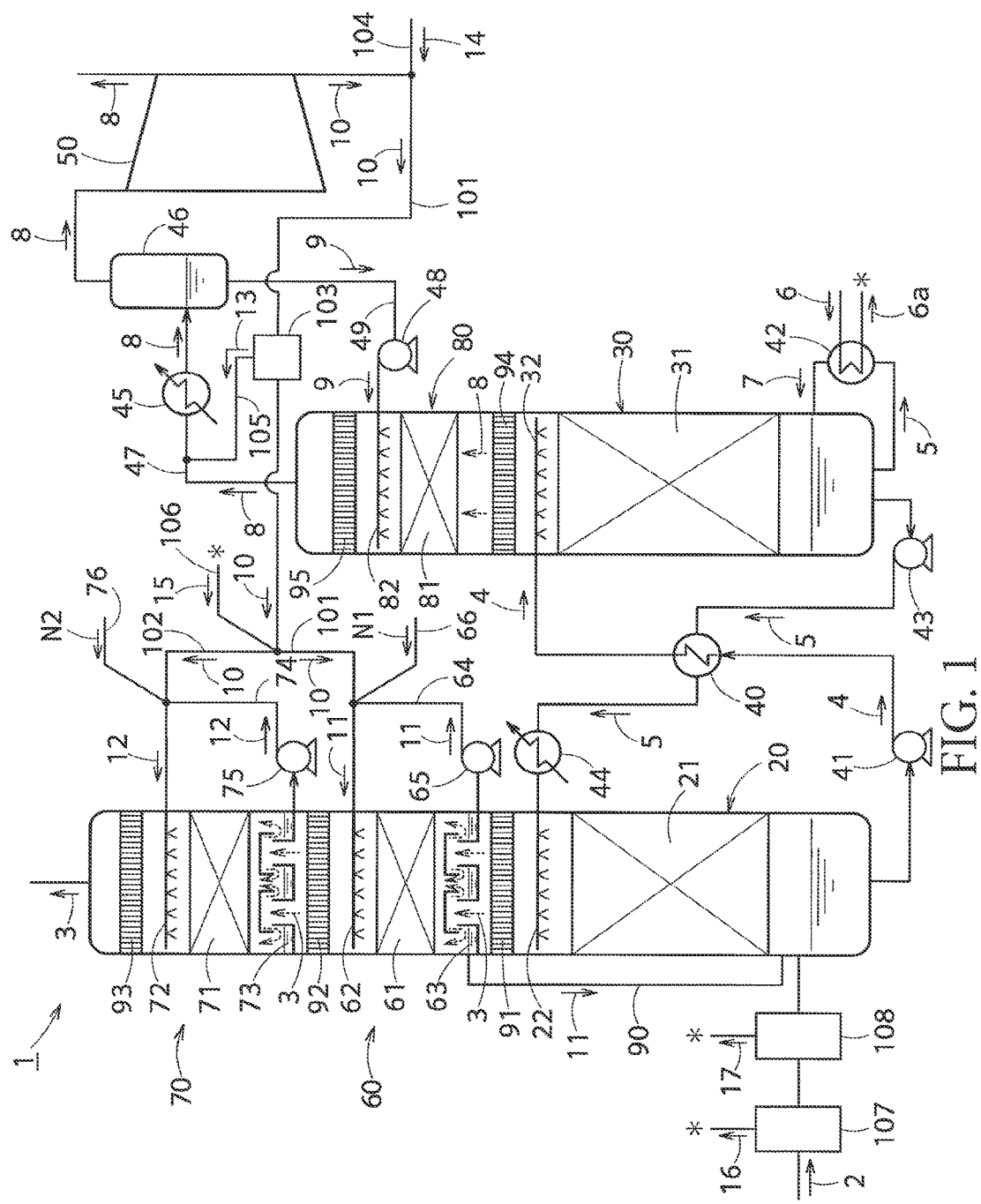
FIG. 1 is a view showing an acid-gas capturing apparatus in a first embodiment of the present invention.

As shown in FIG. 1, a carbon-dioxide capturing apparatus includes an absorption tower (absorber) 20 having an absorption unit 21, and a regeneration tower (stripper) 30 having a regeneration unit 31. The absorption unit 21 is configured to cause carbon dioxide contained in a plant exhaust gas 2 to be absorbed by an absorbing liquid, and to discharge the plant exhaust gas 2 as an absorption-unit exhaust gas 3. The plant exhaust gas 2 whose carbon dioxide has been absorbed by the absorbing liquid is discharged, as the absorption-unit exhaust gas 3, from the absorption unit 21. The regeneration unit 31 is configured to cause the carbon dioxide to be released from the absorbing liquid supplied from the absorption unit 21, the absorption unit having absorbed the carbon dioxide in the absorption unit 21. The released carbon dioxide is discharged from the regeneration unit 31 as a regeneration unit exhaust gas 8. Namely, from the regeneration unit 31, the carbon dioxide having been released from the absorbing liquid, together with steam, is discharged as the regeneration unit exhaust gas 8.

The absorbing liquid circulates in the absorption tower 20 and the regeneration tower 30. The absorbing liquid absorbs carbon dioxide in the absorption unit 21 of the absorption tower 20 to become a rich liquid 4, and releases the carbon dioxide in the regeneration unit 31 of the regeneration tower 30 to become a lean liquid 5. As examples of compounds included in the absorbing liquid, alcoholic hydroxyl group-containing primary amine such as monoethanolamine or 2-amino-2-methyl-1-propanol; alcoholic hydroxyl group-containing secondary amine such as diethanolamine or 2-methylaminoethanol; alcoholic hydroxyl group-containing tertiary amine such as triethanolamine or n-methyldiethanolamine; polyethylene polyamine such as ethylenediamine, triethylenediamine, or diethylenetriamine; cyclic amine such as piperazine, piperidine, or pyrrolidine; poly amine such as xylylenediamine; an amino acid such as a methylaminocarboxylic acid; or a mixture of these may be used. These amine compounds are normally used as aqueous solutions containing the amine compounds in weight percentages of 10 wt % to 70 wt %. A carbon dioxide absorption promoter or a corrosion inhibitor may be added to the absorbing liquid. As other media, methanol, polyethyleneglycol, or sulfolane may be added to the absorbing liquid.

The absorption tower 20 further includes a liquid diffuser 22 disposed above the absorption unit 21. The liquid diffuser 22 is configured to diffuse and drop the lean liquid 5 supplied from the regeneration tower 30 toward the absorption unit 21.

The plant exhaust gas 2 containing carbon dioxide is supplied by a blower (not illustrated) to a lower part of the absorption tower 20, and ascends toward the absorption unit 21 in the absorption tower 20. On the other hand, the lean liquid 5 from the regeneration tower 30 is supplied to the liquid diffuse 22. The lean liquid 5 is diffused and dropped by the liquid diffuser 22 so as to be supplied to the absorption unit 21. The absorption unit 21 is configured as a countercurrent gas-liquid contact device. In the absorption unit 21, the plant exhaust gas 2 and the lean liquid 5 make gas-liquid contact with each other. Thus, the carbon dioxide contained in the plant exhaust gas 2 is absorbed by the lean liquid 5, so that the rich liquid 4 is generated.

The carbon dioxide is removed from the plant exhaust gas 2 that has made gas-liquid contact with the lean liquid 5. Then, the plant exhaust gas 2 is discharged as the absorption-unit exhaust gas 3 from the absorption unit 21, and further ascends in the absorption tower 20. The rich liquid 4 generated in the absorption unit 21 is temporarily stored in a bottom part of the absorption tower 20 and is discharged from the bottom part.

A heat exchanger 40 is provided between the absorption tower 20 and the regeneration tower 30. A rich liquid pump 41 is arranged between the absorption tower 20 and the heat exchanger 40. The rich liquid 4 discharged from the absorption tower 20 is supplied by the rich liquid pump 41 to the regeneration tower 30 through the heat exchanger 40. The heat exchanger 40 is configured to cause heat exchange between the rich liquid 4 supplied from the absorption tower 20 to the regeneration tower 30 and the lean liquid 5 supplied from the regeneration tower 30 to the absorption tower 20. Thus, the lean liquid 5 serves as a heating source to heat the rich liquid 4 up to a desired temperature. In other words, the rich liquid 4 serves as a cooling source to cool the lean liquid 5 down to a desired temperature.

The regeneration tower 30 includes a liquid diffuser 32 disposed above the regeneration unit 31. The liquid diffuser 32 is configured to diffuse and drop the rich liquid 4 supplied from the absorption tower 20 toward the regeneration unit 31.

A reboiler 42 is coupled to the regeneration tower 30. The reboiler 42 is configured to heat the lean liquid 5 in the regeneration tower 30 by means of a heating medium 6. More specifically, a part of the lean liquid 5 discharged from a bottom part of the regeneration tower 30 is supplied to the reboiler 42, while high-temperature steam is supplied as the heating medium 6 from outside, such as a turbine (not shown), to the reboiler 3. The lean liquid 5 supplied to the reboiler 42 exchanges heat with the heating medium 6. Thus, the heating medium 6 serves as a heating source to heat the lean liquid 5. In other words, the lean liquid 5 serves as a cooling source to cool the heating medium 6. When the heating medium 6 is high-temperature steam supplied from the turbine, for example, the heating medium 6 is cooled by the lean liquid 5 and condensed. The condensed heating medium 6 is liquefied. The liquefied heating medium 6 is referred to as "heating liquid 6a" herebelow. The heating medium 6 is not limited to the high-temperature steam from the turbine.

Steam 7 is supplied from the reboiler 42 to a lower part of the regeneration tower 30, and ascends toward the regeneration unit 31 in the regeneration tower 30. On the other hand, the rich liquid 4 from the absorption tower 20 is supplied to the liquid diffuser 32, and diffused and dropped by the liquid diffuser 32 so as to be supplied to the regeneration unit 31. The regeneration unit 31 is configured as a countercurrent gas-liquid contact device. In the regeneration unit 31, the rich liquid 4 and the steam 7 make gas-liquid contact with each other. Thus, carbon dioxide is released from the rich liquid 4, so that the lean liquid 5 is generated. Namely, in the regeneration unit 30, the absorbing liquid is recovered by the release of the carbon dioxide therefrom.

The steam 7 having made gas-liquid contact with the rich liquid 4 is discharged together with carbon dioxide, as the regeneration unit exhaust gas 8, from an upper part of the regeneration tower 30. The lean liquid 5 generated in the regeneration unit 31 is discharged from the bottom part of the regeneration tower 30.

A lean liquid pump 43 is provided between the regeneration tower 30 and the heat exchanger 40. The lean liquid 5 discharged from the regeneration tower 30 is supplied by the lean liquid pump 43 to the absorption tower 20 through the aforementioned heat exchanger 40. As described above, the heat exchanger 40 is configured to conduct heat exchange between the lean liquid 5 supplied from the regeneration tower 30 to the absorption tower 20 and the rich liquid 4 supplied from the absorption tower 20 to the regeneration tower 30, so as to cool the lean liquid 5. In addition, a lean liquid cooler 44 is provided between the heat exchanger 40 and the absorption tower 20. A cooling liquid (cooling water) is supplied from outside to the lean liquid cooler 44, and the lean liquid cooler 44 is configured to further cool the lean liquid 5 cooled in the heat exchanger 4 down to a desired temperature.

The lean liquid 5 cooled in the lean liquid cooler 44 is supplied to the liquid diffuser 22 of the absorption tower 20 and diffused and dropped by the liquid diffuser 22 so as to be supplied to the absorption unit 21. In the absorption unit 21, the lean liquid 5 makes gas-liquid contact with the plant exhaust gas 2, and carbon dioxide contained in the plant exhaust gas 2 is absorbed by the lean liquid 5, so that the lean liquid 5 becomes the rich liquid 4. In this manner, the carbon-dioxide capturing apparatus 1 is configured such that the absorbing liquid circulates therein while it repeatedly becomes the lean liquid 5 and the rich liquid 4.

The carbon-dioxide capturing apparatus 1 shown in FIG. 1 further includes a gas cooler 45 configured to cool the regeneration unit exhaust gas 8 discharged from the top part of the regeneration tower 30, and a gas-liquid separator 46. To be more specific, a regeneration tower exhaust gas line 47 extends from the top part of the regeneration tower 30 so as to be coupled to the gas-liquid separator 46. The gas cooler 45 is disposed on the regeneration tower exhaust gas line 47. The regeneration unit exhaust gas 8 discharged from the top part of the regeneration tower 30 is supplied to the gas cooler 45, and a cooling liquid (cooling water) is supplied thereto from outside. Thus, in the gas cooler 45, steam contained in the regeneration unit exhaust gas 8 is condensed, so that a cooler-condensate liquid 9 is generated. The gas-liquid separator 46 is configured to separate the cooler-condensate liquid 9, which has been generated in the gas cooler 45, from the regeneration unit exhaust gas 8. Thus, the regeneration unit exhaust gas 8 having less moisture contented therein is discharged from the gas-liquid separator 46, and the separated cooler-condensate liquid 9 is also discharged therefrom. The gas-liquid separator and the regeneration tower 30 are coupled by a cooler-condensate liquid line 49 including a condensate liquid pump 48. The cooler-condensate liquid 9 discharged from the gas-liquid separator 46 is supplied to a liquid diffuser 82 of a below-described regeneration tower cleaning unit 80 of the regeneration tower 30.

The regeneration unit exhaust gas 8 discharged from the gas-liquid separator 46 is compressed by a compressor 50 (compression unit). The compressed regeneration unit exhaust gas 8 becomes a gas having a high concentration of carbon dioxide, and is discharged from the compressor 50 so as to be supplied and stored in an installation, not shown. On the other hand, in the compressor 50, upon the compression of the regeneration unit exhaust gas 8, steam contained in the regeneration unit exhaust gas 8 is condensed, so that a compression-condensate liquid 10 is generated. The generated compression-condensate liquid 10 is discharged from the compressor 50, and is supplied to a below-described first absorption-tower cleaning unit 60 through a below-described first compression-condensate-liquid line 101.

The absorption tower 20 according to this embodiment further includes the first absorption-tower cleaning unit 60 (first cleaning unit) configured to clean the absorption-unit exhaust gas 3 discharged from the absorption unit 21, and a second absorption-tower cleaning unit 70 (second cleaning unit) configured to further clean the absorption-unit exhaust gas 3 having been cleaned in the first absorption-tower cleaning unit 60. The first absorption-tower cleaning unit 60 is configured to clean the absorption-unit exhaust gas 3 discharged form the absorption unit 21 by means of a first absorption-tower cleaning liquid 11 (first cleaning liquid), and to capture the absorbing liquid component entrained with the absorption-unit exhaust gas 3. The second absorption-tower cleaning unit 70 is configured to clean the absorption-unit exhaust gas 3 discharged from the first absorption-tower cleaning unit 60 by means of a second absorption-tower cleaning liquid 12 (second cleaning liquid), and to further capture the absorbing liquid component entrained with the absorption-unit exhaust gas 3.

The first absorption-tower cleaning unit 60 includes a first capturing unit 61 disposed above the liquid diffuser 22, a first liquid diffuser 62 disposed above the first capturing unit 61, and a first cleaning-liquid storage unit 63 disposed below the first capturing unit 61. The first capturing unit 61 is configured to bring the first absorption-tower cleaning liquid 11 and the absorption-unit exhaust gas 3 into gas-liquid contact with each other, so as to capture the absorbing liquid component entrained with the absorption-unit exhaust gas 3. The first liquid diffuser 62 is configured to diffuse and drop the first absorption-tower cleaning liquid 11 toward the first capturing unit 61. The first cleaning-liquid storage unit 63 is configured to store the first absorption-tower cleaning liquid 11 flowing down from the first capturing unit 61. The first cleaning-liquid storage unit 63 is located above the liquid diffuser 22.

A first circulation line 64 configured to circulate the first absorption-tower cleaning liquid 11 is coupled to the first cleaning-liquid storage unit 63. The first circulation line 64 includes a first circulation pump 65, and is configured to circulate the first absorption-tower cleaning liquid 11 by extracting the first absorption-tower cleaning liquid 11 stored in the first cleaning-liquid storage unit 63 and by supplying it to the first liquid diffuser 62. The first absorption-tower cleaning liquid 11 supplied to the first liquid diffuser 62 is diffused and dropped so as to be supplied to the first capturing unit 61.

Due to such a structure, the absorption-unit exhaust gas 3 ascending from the absorption unit 21 is supplied to the first capturing unit 61, and the first absorption-tower cleaning liquid 11 diffused and dropped from the first liquid diffuser 62 is supplied to the first capturing unit 61. The first capturing unit 61 is configured as a countercurrent gas-liquid contact device. In the first capturing unit 61, the absorption-unit exhaust gas 3 and the first absorption-tower cleaning liquid 11 make gas-liquid contact with each other, and the absorbing liquid component entrained with the absorption-unit exhaust gas 3 is absorbed and captured by the first absorption-tower cleaning liquid 11. In this manner, the absorption-unit exhaust gas 3 is cleaned. The first absorption-tower cleaning liquid 11 having cleaned the absorption-unit exhaust gas 3 in the first capturing unit 61 flows down from the first capturing unit 61 so as to be stored in the first cleaning-liquid storage unit 63. The absorption-unit exhaust gas 3 cleaned by the first absorption-tower cleaning liquid 11 further ascends in the absorption tower 20.

The first absorption-tower cleaning unit 60 further includes a first new-liquid supply unit 66. In the embodiment shown in FIG. 1, the first new-liquid supply unit 66 is configured as a line for supplying a new liquid N1 (e.g., deionized water) to the first circulation line 64. The first circulation line 64 is configured to be capable of extracting a part of the first absorption-tower cleaning liquid 11. In this manner, the first absorption-tower cleaning unit 60 is configured to be capable of making up the first absorption-tower cleaning liquid 11 in which the absorbing liquid component is accumulated, with the new liquid N1.

In this embodiment, a part of the first absorption-tower cleaning liquid 11 of the first absorption-tower cleaning unit 60 is mixed into the absorbing liquid by means of the cleaning-liquid mixing line 90. The cleaning-liquid mixing line 90 extends from the first cleaning-liquid storage unit 63 of the first absorption-tower cleaning unit 60 to the lower part of the absorption unit 21 of the absorption tower 20. Due to such a structure, a part of the first absorption-tower cleaning liquid 11 stored in the first cleaning-liquid storage unit 63 is supplied to the lower part of the absorption tower 20 through the cleaning-liquid mixing line 90 so as to be mixed into the rich liquid 4 flowing down from the absorption unit 21.

The second absorption-tower cleaning unit 70 includes a second capturing unit 71 disposed above the first liquid diffuser 21b of the first absorption-tower cleaning unit 60, a second liquid diffuser 72 disposed above the second capturing unit 71, and a second cleaning-liquid storage unit 73 disposed below the second capturing unit 71. The second capturing unit 71 is configured to bring the second absorption-tower cleaning liquid 12 and the absorption-unit exhaust gas 3 into gas-liquid contact with each other, so as to capture the absorbing liquid component entrained with the absorption-unit exhaust gas 3. The second liquid diffuser 72 is configured to diffuse and drop the second absorption-tower cleaning liquid 12 toward the second capturing unit 71. The second cleaning-liquid storage unit 73 is configured to store the second absorption-tower cleaning liquid 12 flowing down from the second capturing unit 71. The second cleaning-liquid storage unit 73 is located above the first liquid diffuser 62.

A second circulation line 74 configured to circulate the second absorption-tower cleaning liquid 12 is coupled to the second absorption-tower cleaning unit 70. Namely, the second circulation line 74 includes a second circulation ump 75, and is configured to circulate the second absorption-tower cleaning liquid 12 by extracting the second absorption-tower cleaning liquid 12 stored in the second cleaning-liquid storage unit 73 and by supplying it to the second liquid diffuser 72. The second absorption-tower cleaning liquid 12 supplied to the second liquid diffuser 72 is diffused and dropped so as to be supplied to the second capturing unit 71.

Due to such a structure, the absorption-unit exhaust gas 3 ascending from the first absorption-tower cleaning unit 60 is supplied to the second capturing unit 71, and the second absorption-tower cleaning liquid 12 diffused and dropped from the second liquid diffuser 71 is supplied to the second capturing unit 71. The second capturing unit 71 is configured as a countercurrent gas-liquid contact device. In the second capturing unit 71, the absorption-unit exhaust gas 3 and the second absorption-tower cleaning liquid 12 make gas-liquid contact with each other, and the absorbing liquid component entrained with the absorption-unit exhaust gas 3 is absorbed and captured by the second absorption-tower cleaning liquid 12. In this manner, the absorption-unit exhaust gas 3 is cleaned. The second absorption-tower cleaning liquid 12 having cleaned the absorption-unit exhaust gas 3 in the second capturing unit 71 flows down from the second capturing unit 71 so as to be stored in the second cleaning-liquid storage unit 73. The absorption-unit exhaust gas 3 cleaned by the second absorption-tower cleaning liquid 12 further ascends in the absorption tower 20 so as to be discharged form the top part of the absorption tower 20 into the atmospheric air.

The second absorption-tower cleaning unit 70 further includes a second new-liquid supply unit 76. In the embodiment shown in FIG. 1, the second new-liquid supply unit 76 is configured as a line for supplying a new liquid N2 (e.g., deionized water) to the second circulation line 74. The second circulation line 74 is configured to be capable of extracting a part of the second absorption-tower cleaning liquid 12. In this manner, the second absorption-tower cleaning unit 70 is configured to be capable of making up the second absorption-tower cleaning liquid 12 in which the absorbing liquid component is accumulated, with the new liquid N2.

A first demister 91, which is configured to capture mist of the absorbing liquid entrained with the absorption-unit exhaust gas 3, is disposed between the liquid diffuser 22 and the first cleaning-liquid storage unit 63. A second demister 92, which is configured to capture mist of the absorbing liquid entrained with the absorption-unit exhaust gas 3 and mist of the first absorption-tower cleaning liquid 11, is disposed between the first liquid diffuser 62 and the second cleaning-liquid storage unit 73. A third demister 93, which is configured to capture mist of absorbing liquid entrained with the absorption-unit exhaust gas 3, mist of the first absorption-tower cleaning liquid 11 and mist of the second absorption-tower cleaning liquid 12, is disposed above the second liquid diffuser 72 of the second absorption-tower cleaning unit 70.

As shown in FIG. 1, the regeneration tower 30 further includes a regeneration tower cleaning unit 80 configured to clean the regeneration unit exhaust gas 8 discharged from the regeneration unit 31. The regeneration tower cleaning unit 80 is configured to clean the regeneration unit exhaust gas 8 of the cooler-condensate liquid 9 supplied from the gas-liquid separator 46, and to capture the absorbing liquid component entrained with the regeneration unit exhaust gas 8.

The regeneration tower cleaning unit 80 includes a regeneration tower capturing unit 81 disposed above the liquid diffuser 32, and a liquid diffuser 82 disposed above the regeneration tower capturing unit 81. The regeneration tower capturing unit 81 is configured to bring the regeneration unit exhaust gas 8 and the cooler-condensate liquid 9 into gas-liquid contact with each other so as to capture the absorbing liquid component entrained with the regeneration unit exhaust gas 8. The liquid diffuser 82 is configured to diffuse and drop the cooler-condensate liquid 9 supplied from the cooler-condensate liquid line 49 toward the regeneration tower capturing unit 81.

Due to such a structure, the regeneration unit exhaust gas 8 ascending from the regeneration unit 31 is supplied to the regeneration tower capturing unit 81. On the other hand, the cooler-condensate liquid 9 is supplied from the gas-liquid separator 46 to the liquid diffuser 82, and the cooler-condensate liquid 9 diffused and droved from the liquid diffuser 82 is supplied to the regeneration tower capturing unit 81. The regeneration tower capturing unit 81 is configured as a countercurrent gas-liquid contact device. In the regeneration tower capturing unit 81, the regeneration unit exhaust gas 8 and the cooler-condensate liquid 9 make gas-liquid contact with each other, and the absorbing liquid component entrained with the regeneration unit exhaust gas 8 is absorbed and captured by the cooler-condensate liquid 9. In this manner, the regeneration unit exhaust gas 8 is cleaned. The cooler-condensate liquid 9 having cleaned the regeneration unit exhaust gas 8 in the regeneration tower capturing unit 81 flows down from the regeneration tower capturing unit 81 so as to be supplied to the regeneration unit 31, and is mixed with the rich liquid 4. The regeneration unit exhaust gas 8 cleaned by the cooler-condensate liquid 9 ascends in the regeneration tower 30 so as to be discharged from the top part of the regeneration tower 30.

A fourth demister 94, which is configured to capture mist of the absorbing liquid entrained with the regeneration unit exhaust gas 8, is disposed between the liquid diffuser 32 and the regeneration tower capturing unit 81. A fifth demister 95, which is configured to capture mist of the absorbing liquid entrained with the regeneration unit exhaust gas 8 and mist of the cooler-condensate liquid 9, is disposed above the liquid diffuser 82.

In this embodiment, as shown in FIG. 1, the compression-condensate liquid 10 discharged from the compressor 50 is mixed into the first absorption-tower cleaning liquid 11 of the first absorption-tower cleaning unit 60 and the second absorption-tower cleaning liquid 12 of the second absorption-tower cleaning unit 70, through the first compression-condensate-liquid line 101. Namely, one end of the first compression-condensate-liquid line 101 is connected to the compressor 50, and the other end thereof is connected to the first circulation line 64 of the first absorption-tower cleaning unit 60, so as to couple an outlet of the compressor 50 and the first circulation line 64. Thus, the compression-condensate liquid 10 is supplied to the first circulation line 64. The compression-condensate liquid 10 supplied to the first circulation line 64 is mixed into the first absorption-tower cleaning liquid 11 flowing through the first circulation line 64. In addition, the compression-condensate liquid is mixed into the second absorption-tower cleaning liquid 12 of the second absorption-tower cleaning unit 70 through a second compression-condensate-liquid line 102. To be more specific, the second compression-condensate-liquid line 102 is coupled to the second circulation line 74 of the second absorption-tower cleaning unit 70 so as to branch from a portion of the first compression-condensate-liquid line 101, between a decompression unit 103 (described below) and the first circulation line 64. Thus, the compression-condensate liquid 10 is supplied to the second circulation line 74 through the first compression-condensate-liquid line 101 and the second compression-condensate-liquid line 102. The compression-condensate liquid 10 supplied to the second circulation line 74 is mixed into the second absorption-tower cleaning liquid 12 flowing through the second circulation line 74.

In this embodiment, the first compression-condensate-liquid line 101 includes the decompression unit 103 configured to decompress the compression-condensate liquid 10, and a diluent supply unit 104 disposed between the compressor 50 and the decompression unit 103.

The decompression unit 103 is configured to reduce a pressure of the compression-condensate liquid 10 having a relatively high pressure, which has been discharged from the compressor 50, so as to decrease a difference between the pressure of the compression-condensate liquid 10 and a pressure of the first absorption-tower cleaning liquid 11 in the first circulation line 64 or a pressure of the second absorption-tower cleaning liquid 12 in the second circulation line 74. In addition, in the decompression unit 103, upon the decompression of the compression-condensate liquid 10, a condensate liquid gas 13 containing carbon dioxide and steam is generated. The generated condensate liquid gas 13 is mixed into the regeneration unit exhaust gas 8 through a gas return line 105. To be more specific, the gas return line 105 extends from the decompression unit 103 to a portion of the regeneration tower exhaust gas line 47, between the regeneration tower 30 and the gas cooler 45, and the condensate liquid gas 13 is mixed into the regeneration unit exhaust gas 8 flowing through this portion. Preferably, the decompression unit 103 decompresses the compression-condensate liquid 10 to a degree that the decompression-condensate liquid 10 can be smoothly supplied to the first circulation line 64 and the second circulation line 74, and to a degree that the circulation flows of the absorption-tower cleaning liquids 11 and 12 in the respective circulation lines 64 and 74 are not inhibited. In addition, the gas return line 105 may include a pump (not shown) for supplying the condensate liquid gas 13 generated in the decompression unit 103 smoothly to the gas cooler 45.

The diluent supply unit 104 is configured to mix a diluent (e.g., deionized water) for diluting the compression-condensate liquid 10, into the compression-condensate liquid 10. In the embodiment shown in FIG. 1, the diluent supply unit 104 is configured as a line coupled to join a portion of the first compression-condensate-liquid line 101, between the compressor 50 and the decompression unit 103. The diluent 14 is supplied to this portion so as to be mixed into the compression-condensate liquid 10. The diluent supply unit 104 may include a pump (not shown) for supplying the diluent 14 smoothly to the first compression-condensate-liquid line 101.

In addition, as shown in FIG. 1, the first compression-condensate-liquid line 101 includes a refill-liquid supply unit 106 to which the heating liquid 6a from the reboiler is supplied. In the embodiment shown in FIG. 1, the refill-liquid supply unit 106 is configured as a line coupled to join a branch point from which the second compression-condensate-liquid line 102 is branched from the first compression-condensate-liquid line 101. The heating liquid 6a obtained by heating and condensing the lean liquid 5 is supplied to the refill-liquid supply unit 106 from the reboiler 42. The heating liquid 6a is supplied as a refill liquid 15 to the first compression-condensate-liquid line 101 to be mixed into the compression-condensate liquid 10, and thereafter mixed into the absorption-tower cleaning liquids 11 and 12. A desalinated condensate liquid 16, which is generated when the plant exhaust gas 2 before it is supplied to the absorption tower 20 is desalinated, is supplied to the refill-liquid supply unit 106 from a below-described desalination tower 107. In addition, an exhaust-gas condensate liquid 17, which is generated when the plant exhaust gas 2 is cooled, is supplied to the refill-liquid supply unit 106 from a below-described exhaust-gas cooling tower 108. Similarly to the heating liquid 6a, these desalinated condensate liquid 16 and the exhaust-gas condensate liquid 17 are mixed into the compression-condensate liquid 10 and thereafter mixed into the absorption-tower cleaning liquids 11 and 12.

The plant exhaust gas 2 supplied to the absorption tower 20 is not specifically limited. For example, the plant exhaust gas 2 may be a combustion exhaust gas discharged from a thermal plant or a steel plant. In this embodiment, as shown in FIG. 1, the plant exhaust gas 2 is treated in an exhaust-gas treatment unit before it is supplied to the absorption tower 20. The exhaust-gas treatment unit is not specifically limited but may be a desalination tower 107, for example. The desalination tower 107 is configured to desalinate the plant exhaust gas 2 before it is supplied to the absorption unit 21. Upon the desalinization treatment, steam contained in the plant exhaust gas 2 is condensed, so that a desalinized condensate liquid 16 (treatment-unit discharge liquid) is generated. The generated desalinated condensate liquid 16 is discharged from the desalination tower 107 and is supplied to the aforementioned refill-liquid supply unit 106.

Another example of the exhaust-gas treatment unit is a desulphurization tower (not shown). The desulphurization tower is configured to desulphurize the plant exhaust gas 2 before it is supplied to the absorption unit 21, by using a desulphurizing liquid (treatment-unit discharge liquid). The desulphrized liquid is discharged from the desulphurization tower and is supplied to the aforementioned refill-liquid supply unit 106. Preferably, deionized water is used as the desulphurizing liquid, for example.

In addition, as shown in FIG. 1, an exhaust-gas cooling tower 108, which is another example of the exhaust-gas treatment unit, is disposed between the desalination tower 107 and the absorption tower 20. The exhaust-gas cooling tower 108 is configured to cool the plant exhaust gas 2, which has been desalinized by the desalination tower 107 and is not yet supplied to the absorption unit 21. Upon cooling, steam contained in the plant exhaust gas 2 is condensed, so that an exhaust-gas condensate liquid 17 (treatment-unit discharge liquid) is generated. The generated exhaust-gas condensate liquid 17 is discharged from the exhaust-gas cooling tower, and is supplied to the aforementioned refill-liquid supply unit 106.

Next, an operation of this embodiment as structured above is described.

While the carbon-dioxide capturing apparatus 1 is operated, the regeneration unit exhaust gas 8 discharged from the regeneration unit 31 is supplied to the gas cooler 45 so as to be cooled. The cooled regeneration unit exhaust gas 8 is supplied to the gas-liquid separator 46, and the cooler-condensate liquid 9 is separated from the regeneration unit exhaust gas 8 in the gas-liquid separator 46. The regeneration unit exhaust gas 8, from which the cooler-condensate liquid 9 has been separated, is supplied from the gas-liquid separator 46 to the compressor 50 so as to be compressed.

Upon compression of the regeneration unit exhaust gas 8, steam contained in the regeneration unit exhaust gas 8 is condensed, so that the compression-condensate liquid 10 is generated.

The absorbing-liquid component concentration of the compression-condensate liquid 10 discharged from the compressor 50 is low. Namely, a part of the absorbing liquid component entrained with the regeneration unit exhaust gas 8, which has been discharged from the regeneration tower 30, is absorbed into the cooler-condensate liquid 9 generated in the gas cooler 45, and the cooler-condensate liquid 9 having absorbed the absorbing liquid component is separated from the regeneration unit exhaust gas 8 in the gas-liquid separator 46. Thus, an amount of the absorbing liquid component entrained with the regeneration unit exhaust gas 8 supplied to the compressor 50 is smaller than an amount of the absorbing liquid component entrained with the regeneration unit exhaust gas 8 before it is supplied to the gas cooler 45. As a result, the absorbing-liquid component concentration of the compression-condensate liquid 10 discharged from the compressor 50 can be made lower than the absorbing-liquid component concentration of the cooler-condensate liquid 9 discharged from the gas-liquid separator 46.

In addition, the carbon dioxide concentration of the compression-condensate liquid 10 discharged from the compressor 50 is high. Namely, the pressure of the regeneration unit exhaust gas 8 in the compressor 50 is higher than the pressure of the regeneration unit exhaust gas 8 in the gas cooler 45 or in the gas-liquid separator 46. Thus, the carbon dioxide concentration of the compression-condensate liquid 10 discharged from the compressor 50 can be made higher than the carbon dioxide concentration of the cooler-condensate liquid 9 discharged from the gas-liquid separator 46, whereby the pH of the compression-condensate liquid 10 can be decreased.

The compression-condensate liquid 10 discharged from the compressor 50 flows through the first compression-condensate-liquid line 101 so as to be supplied to the first circulation line 64 of the first absorption-tower cleaning unit 60 and the second circulation line 74 of the second absorption-tower cleaning unit 70. At this time, the high-pressure compression-condensate liquid 10 is decompressed in the decompression unit 103. Thus, the difference between the pressure of the compression-condensate liquid 10 and the pressure of the first absorption-tower cleaning liquid 11 in the first circulation line 64 or the pressure of the second absorption-tower cleaning liquid 12 in the second circulation line 74 is decreased, whereby the circulation flows of the absorption cleaning liquid 11 and 12 in the respective circulation lines 64 and 74 can be prevented from being disturbed.

Upon decompression of the compression-condensate liquid 10, the condensate liquid gas 13 is generated from the compression-condensate liquid 10. The generated condensate liquid gas 13 is mixed into the regeneration unit exhaust gas 8 through the gas return line 105, and is supplied to the gas cooler 45 so as to be cooled. Thus, steam contained in the condensate liquid gas 13 is condensed, so that the cooler-condensate liquid 9 is generated. Thus, an amount of emission of the cooler-condensate liquid 9 from the gas-liquid separator 46 can be increased. In addition, since the condensate liquid gas 13 contains carbon dioxide, by mixing the condensate liquid gas 13 into the regeneration unit exhaust gas 8, it can be prevented that the carbon dioxide is released into the atmospheric air.

The compression-condensate liquid 10 supplied to the first circulation line 64 is mixed into the first absorption-tower cleaning liquid 11 in the first circulation line 64, and cleans the absorption-unit exhaust gas 3 in the first capturing unit 61 of the first absorption-tower cleaning unit 60. As described above, since absorbing-liquid component concentration of the compression-condensate liquid 10 is low, the absorbing-liquid component concentration of the first absorption-tower cleaning liquid 11, into which the compression-condensate liquid 10 has been mixed, can be made lower. In addition, since the pH of the compression-condensate liquid 10 is low, the pH of the first absorption-tower cleaning liquid 11, into which the compression-condensate liquid 10 has been mixed, can be made lower. Thus, the alkali absorbing liquid component entrained with the absorption-unit exhaust gas 3 can be efficiently captured in the first absorption-tower cleaning unit 60 upon cleaning.

The first absorption-tower cleaning liquid 11 having cleaned the absorption-unit exhaust gas 3 in the first capturing unit 61 is stored in the first cleaning-liquid storage unit 63. A part of the stored first absorption-tower cleaning liquid 11 is supplied to the first liquid diffuser 62 through the first circulation line 64, while another part thereof is supplied to the lower part of the absorption tower 20 through the cleaning-liquid mixing line 90 so as to be mixed into the rich liquid 4. Thus, the first absorption-tower cleaning liquid 11 in which the absorbing liquid component is accumulated can be used as the absorbing liquid. In this case, an amount of the first absorption-tower cleaning liquid 11 to be discarded for making up can be decreased.

The compression-condensate liquid 10 supplied to the second circulation line 74 is mixed into the second absorption-tower cleaning liquid 12 in the second circulation line 74, and cleans, in the second capturing unit 71 of the second absorption-tower cleaning unit 70, the absorption-unit exhaust gas 3 discharged from the first capturing unit 61. As described above, since the absorbing-liquid component concentration of the compression-condensate liquid 10 is low, the absorbing-liquid component concentration of the second absorption-tower cleaning liquid 12, into which the compression-condensate liquid 10 has been mixed, can be made lower. In addition, since the pH of the compression-condensate liquid 10 is low, the pH of the second absorption-tower cleaning liquid 12, into which the compression-condensate liquid 10 has been mixed, can be made lower. Thus, the alkali absorbing liquid component entrained with the absorption-unit exhaust gas 3 can be efficiently captured in the second absorption-tower cleaning unit 70 upon cleaning.

The second absorption-tower cleaning liquid 12 having cleaned the absorption-unit exhaust gas 3 in the second capturing unit 71 is stored in the second cleaning-liquid storage unit 73. The stored second absorption-tower cleaning liquid 12 is supplied to the second liquid diffuser 72 through the second circulation line 74.

In this embodiment, in order to prevent lowering of the carbon dioxide concentration of the compression-condensate liquid 10 after decompression, the diluent 14 is supplied from the diluent supply unit 104 to the first compression-condensate-liquid line 101 so as to be mixed into the compression-condensate liquid 10 before decompression. In this case, the carbon dioxide concentration of the compression-condensate liquid 10 before decompression can be made lower, whereby it can be prevented that the carbon dioxide is released from the compression-condensate liquid 10 upon decompression. Thus, the carbon dioxide concentration of the compression-condensate liquid 10 after decompression can be made higher, whereby the pH of the first absorption-tower cleaning liquid 11 and the pH of the second absorption-tower cleaning liquid 12 can be made higher. As a result, in the first absorption-tower cleaning unit 60 and the second absorption-tower cleaning unit 70, the alkali absorbing liquid component entrained with the absorption-unit exhaust gas 3 can be efficiently captured upon cleaning. In addition, since the diluent 14 is mixed, liquid amounts of the first absorption-tower cleaning liquid 11 and the second absorption-tower cleaning liquid 12 can be increased.

In addition, in this embodiment, as described above, the compression-condensate liquid 10 is mixed into the first absorption-tower cleaning liquid 11 and the second absorption-tower cleaning liquid 12. Thus, the compression-condensate liquid 10 can be used in place of the new liquid N1 and N2 supplied from first new-liquid supply unit 66 and the second new-liquid supply unit 76. As a result, amounts of the new liquids N1 and N2 to be used in the first absorption-tower cleaning unit 60 and the second absorption-tower cleaning unit 70 can be decreased, as well as an operation cost can be decreased. In addition, since the compression-condensate liquid 10 discharged from the compressor 50 can be used as the absorption-tower cleaning liquids 11 and 12, discarding of compression-condensate liquid can be avoided. When an emission amount of the compression-condensate liquid 10 is too large, a part of the compression-condensate liquid 10 may be extracted and discarded without being mixed into the absorption-tower cleaning liquids 11 and 12.

In addition, in this embodiment, the first compression-condensate-liquid line 101 includes the refill-liquid supply unit 106. Thus, the heating liquid 6a from the reboiler 42, the desalinated condensate liquid 16 from the desalination tower 107, and the exhaust-gas condensate liquid 17 from the exhaust-gas cooling tower 108 can be supplied as the refill liquid 15 from the refill-liquid supply unit 106 to be mixed into the compression-condensate liquid 10 after decompression. Thus, the liquid amounts of the absorption-tower cleaning liquids 11 and 12 can be increased. In addition, these liquids 6a, 15 and 16 can be used in place of the new liquid N1 and N2. Thus, amounts of the new liquids N1 and N2 to be used can be further decreased, as well as an operation cost can be further decreased.

During the operation of the carbon-dioxide capturing apparatus 1, in order to make up the first absorption-tower cleaning liquid 11, a part of the first absorption-tower cleaning liquid 11 is extracted and discarded. When an extraction amount of the first absorption-tower cleaning liquid 11 can be made equal to a total mixing amount of a mixing amount of the compression-condensate liquid 10 and a mixing amount of the refill liquid 15, the need for supplying the new liquid N1 from the first new-liquid supply unit 66 to the first circulation line 64 can be eliminated. When the total mixing amount is less than the extraction amount, the new liquid N1 is preferably supplied from the first new-liquid supply unit 66 to the first circulation line 64. Thus, the first absorption-tower cleaning liquid 11 can be made up while ensuring its liquid amount, whereby lowering of efficiency for capturing the absorbing liquid component in the first absorption-tower cleaning unit 60 can be prevented. The same making-up operation can be carried out also in the second absorption-tower cleaning unit 70, and detailed description thereof is omitted herein.

As described above, according to this embodiment, the compression-condensate liquid 10 discharged from the compressor 50 is mixed into the first absorption-tower cleaning liquid 11 through the first compression-condensate-liquid line 101. Since the absorbing-liquid component concentration of the compression-condensate liquid 10 is low, the absorbing-liquid component concentration of the first absorption-tower cleaning liquid 11 can be made lower. Thus, in the first absorption-tower cleaning unit 60, the absorbing liquid component entrained with the absorption-unit exhaust gas 3 can be efficiently captured upon cleaning. As a result, the efficiency of capturing the absorbing liquid component in the absorption-unit exhaust gas 3 can be improved. In particular, according to this embodiment, since the compression-condensate liquid 10 is also mixed into the second absorption-tower cleaning liquid 12, the absorbing liquid component entrained with the absorption-unit exhaust gas 3 can be efficiently captured also in the second absorption-tower cleaning unit 70. Therefore, the efficiency of capturing the absorbing liquid component in the absorption-unit exhaust gas 3 can be further improved.

In the above-described embodiment, the first absorption-tower cleaning unit 60 includes the first cleaning-liquid storage unit 63 configured to store the first absorption-tower cleaning liquid 11, and the first circulation line 64 configured to circulate the first absorption-tower cleaning liquid 11, by way of example. However, the present invention is not limited thereto. For example, the first absorption-tower cleaning liquid 11 having cleaned the absorption-unit exhaust gas 3 may flow down from the first capturing unit 61 to the absorption unit 21. In this case, the compression-condensate liquid 10 is supplied to the first liquid diffuser 21b of the first absorption-tower cleaning unit 60 so as to be mixed into the first absorption-tower cleaning liquid 11.

In addition, in the above-described embodiment, the compression-condensate liquid 10 is mixed into both the first absorption-tower cleaning liquid 11 and the second absorption-tower cleaning liquid 12, by way of example. However, not limited thereto, the compression-condensate liquid 10 may be mixed into any one of the first absorption-tower cleaning liquid 11 and the second absorption-tower cleaning liquid 12, and may not be mixed into the other. For example, the second capturing unit 71 of the second absorption-tower cleaning unit 70 shown in FIG. 1 may be disposed below the first capturing unit 61 of the first absorption-tower cleaning unit 60, and the second compression-condensate-liquid line 102 may not be provided. In this case, the second absorption-tower cleaning unit 70 cleans the absorption-unit exhaust gas 3 before it is cleaned by the first absorption-tower cleaning unit 60, by means of the second absorption-tower cleaning liquid 12 into which no compression-condensate liquid 10 is mixed. Then, the first absorption-tower cleaning unit 60 cleans the absorption-unit exhaust gas 3, which has been cleaned by the second absorption-tower cleaning unit 70, by means of the first absorption-tower cleaning liquid 11 into which the compression-condensate liquid 10 has been mixed. Thus, since the cleaning ability of the first absorption-tower cleaning liquid 11 can be made higher than the cleaning ability of the second absorption-tower cleaning liquid 12, even the absorption-unit exhaust gas 3 cleaned by the second absorption-tower cleaning unit 70 can be effectively cleaned by the first absorption-tower cleaning unit 60 and its absorbing liquid component can be captured.

In addition, in the above-described embodiment, the absorption tower 20 includes the first absorption-tower cleaning unit 60 and the second absorption-tower cleaning unit 70, by way of example. However, not limited thereto, the first absorption-tower cleaning unit 60 and the second absorption-tower cleaning unit 70 may be installed in a tower different from the absorption tower 20, or the first absorption-tower cleaning unit 60 and the second absorption-tower cleaning unit 70 may be installed in towers different from each other.

In addition, in the above-described embodiment, the absorption-unit exhaust gas 3, which has been cleaned by the first absorption-tower cleaning unit 60, is further cleaned by the second absorption-tower cleaning unit 70, by way of example. However, the present invention is not limited thereto. For example, when the absorbing liquid component of the absorption-unit exhaust gas 3 can be sufficiently captured by the first absorption-tower cleaning unit 60, the second absorption-tower cleaning unit 70 may be omitted.

In addition, in the above-described embodiment, the heating liquid 6a from the reboiler 42, the desalinated condensate liquid 16 from the desalination tower 107 and the exhaust-gas condensate liquid 17 from the exhaust-gas cooling tower 108 are mixed into the compression-condensate liquid 10, by way of example. However, not limited thereto, at least one of the heating liquid 6a, the desalinated condensate liquid 16 and the exhaust-gas condensate liquid 17 may be mixed into the compression-condensate liquid 10. Also in this case, the amounts of the new liquids N1 and N2 to be used can be decreased.

In addition, in the above-described embodiment, the condensate liquid gas 13 generated in the decompression unit 103 is mixed through the gas return line 105 into the regeneration unit exhaust gas 8 before it is supplied to the gas cooler 45, by way of example. However, not limited thereto, the condensate liquid gas 13 may be mixed into the regeneration unit exhaust gas 8 after it has been cooled by the gas cooler 45, as long as the regeneration unit exhaust gas 8 is not yet supplied to the compressor 50.

Further, in the above-described embodiment, the plant exhaust gas 2 is a gas containing carbon dioxide, by way of example. However, not limited thereto, the plant exhaust gas 2 may be a gas containing another compound, which does not contain carbon dioxide. For example, when the plant exhaust gas 2 is an acid gas, the plant exhaust gas 2 may be a gas containing hydrogen sulfide ($H_2S$), carbonyl sulfide (COS), carbon disulfide ($CS_2$) or hydrogen cyanide (HCN) or a gas containing ammonia ($NH_3$).

Second Embodiment

Next, an acid-gas capturing apparatus and an acid-gas capturing method in a second embodiment is described with reference to FIG. 2.

Figure 2:
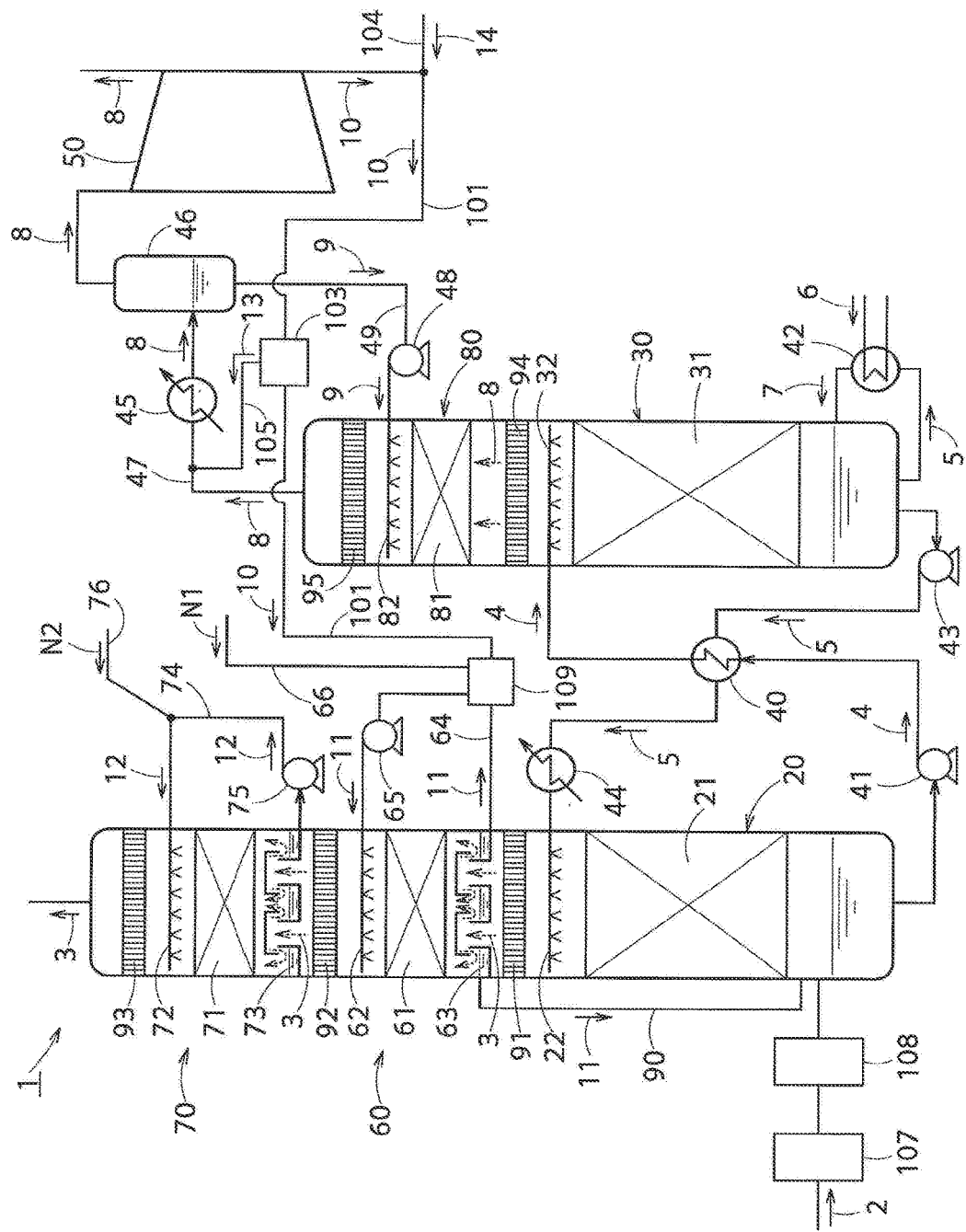
FIG. 2 is a view showing the acid-gas capturing apparatus in a second embodiment of the present invention.

The second embodiment shown in FIG. 2 differs mainly from the first embodiment shown in FIG. 1 in that a first circulation line includes a cleaning liquid tank configured to store a first absorption-tower cleaning liquid, and that a first compression-condensate-liquid line is coupled to the cleaning liquid tank, while the other structure is substantially the same as that of the first embodiment. In FIG. 2, the same parts as those of the first embodiment are indicated by the same symbols, and their detailed description is omitted.

In this embodiment, as shown in FIG. 2, a first circulation line 64 of a first absorption-tower cleaning unit 60 includes a cleaning liquid tank 109 configured to store a first absorption-tower cleaning liquid 11. A first compression-condensate-liquid line 101 is coupled to the cleaning liquid tank 109. A compression-condensate liquid 10 discharged from a compressor 50 is supplied to the cleaning liquid tank 109. On the other hand, the first absorption-tower cleaning liquid 11 is supplied from a first cleaning-liquid storage unit 63 to the cleaning liquid tank 109. Thus, the compression-condensate liquid 10 supplied into the cleaning liquid tank 109 is mixed into the first absorption-tower cleaning liquid 11. The first absorption-tower cleaning liquid 11 in the cleaning liquid tank 109 is extracted by a first circulation pump 65 and is supplied to a first liquid diffuser 62. When the first absorption-tower cleaning liquid 11 in the first cleaning-liquid storage unit 63 reaches a predetermined liquid level, the first absorption-tower cleaning liquid 11 may be supplied from the first cleaning-liquid storage unit 63 to the cleaning liquid tank 109. Alternatively, the first absorption-tower cleaning liquid 11 in the first cleaning-liquid storage unit 63 may be extracted by a pump, not shown, and may be supplied to the cleaning liquid tank 109.

As shown in FIG. 2, in this embodiment, a first new-liquid supply unit 66 is configured to supply a new liquid N1 to the cleaning liquid tank 109. However, not limited thereto, the first new-liquid supply unit 66 may be configured to supply the new liquid N1 not to the cleaning liquid tank 109 but to the first circulation line 64.

As described above, according to this embodiment, the first compression-condensate-liquid line 101 is coupled to the cleaning liquid tank 109 of the first circulation line 64, and the compression-condensate liquid 10 from the first compression-condensate-liquid line 101 is mixed into the first absorption-tower cleaning liquid 11 in the cleaning liquid tank 109. Thus, it can be prevented that the compression-condensate liquid 10 is non-uniformly mixed into the first absorption-tower cleaning liquid 11, whereby the compression-condensate liquid 10 can be uniformly mixed into the first absorption-tower cleaning liquid 11. Thus, in the first absorption-tower cleaning unit 60, the absorbing liquid component entrained with the absorption-unit exhaust gas 3 can be efficiently captured upon cleaning.

Third Embodiment

An acid-gas capturing apparatus and an acid-gas capturing method in a third embodiment is described with reference to FIG. 3.

Figure 3:
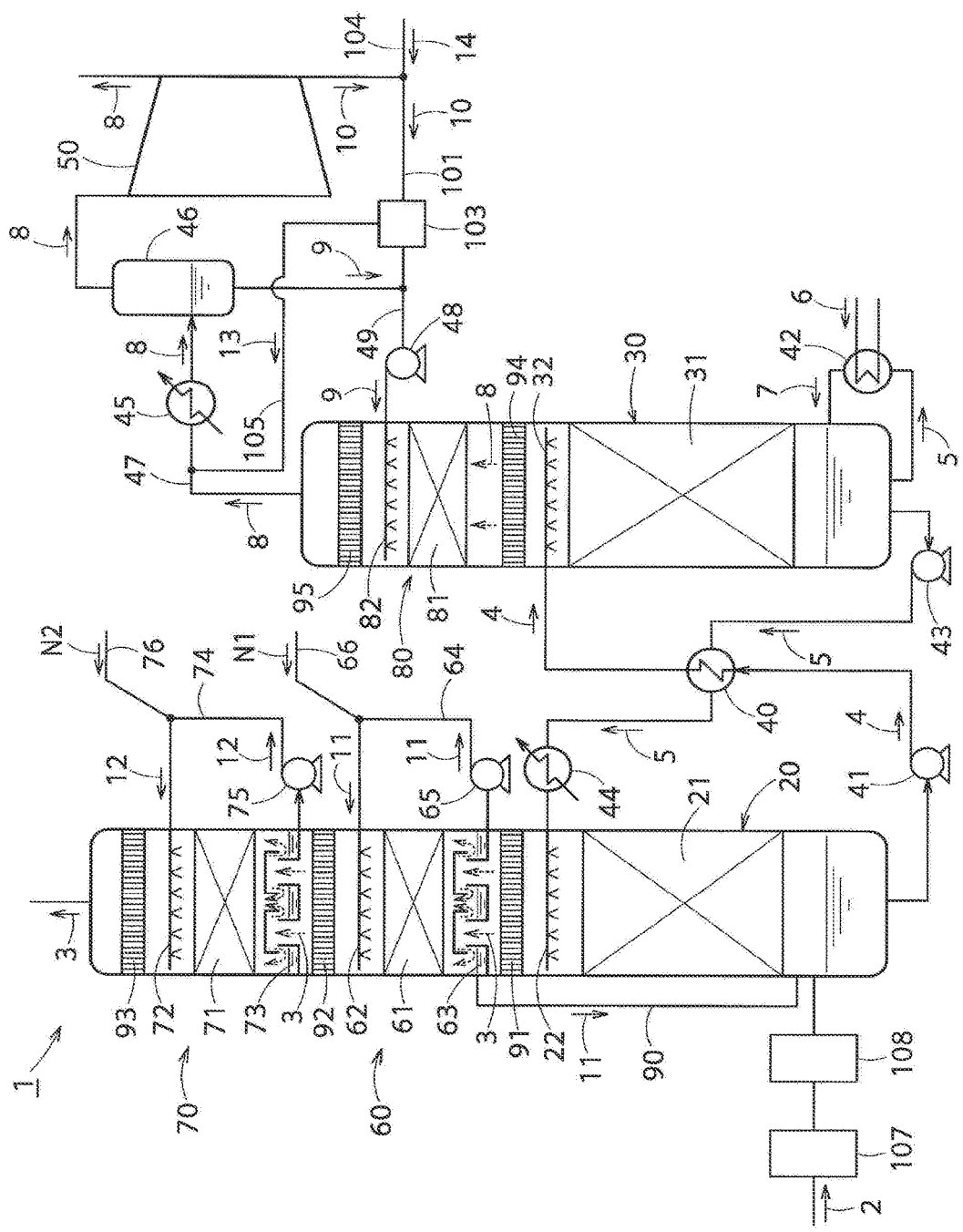
FIG. 3 is a view showing the acid-gas capturing apparatus in a third embodiment of the present invention.

The third embodiment shown in FIG. 3 differs mainly from the first embodiment shown in FIG. 1 in that a compression-condensate liquid is mixed into a cooler-condensate liquid of a regeneration tower cleaning unit, while the other structure is substantially the same as that of the first embodiment. In FIG. 3, the same parts as those of the first embodiment are indicated by the same symbols, and their detailed description is omitted.

As show in FIG. 3, in this embodiment, a first compression-condensate-liquid line 101 couples an outlet of a compressor 50 and a cooler-condensate liquid line 49. Thus, a compression-condensate liquid 10 discharged from the compressor 50 is mixed, through the first compression-condensate-liquid line 101, into a cooler-condensate liquid 9 (first cleaning liquid) which functions as a regeneration tower cleaning liquid of a regeneration tower cleaning unit 80 (first cleaning unit). The regeneration tower cleaning unit 80 is configured to clean a regeneration unit exhaust gas 8 before it is compressed by the compressor 50 (more specifically, before it is discharged from the regeneration tower 30) by means of the cooler-condensate liquid 9 into which the compression-condensate liquid 10 has been mixed, so as to capture an absorbing liquid component entrained with the regeneration unit exhaust gas 8.

As described above, according to this embodiment, the compression-condensate liquid 10 discharged from the compressor 50 is mixed into the cooler-condensate liquid 9 through the first compression-condensate-liquid line 101. Since the absorbing-liquid component concentration of the compression-condensate liquid 10 is low, the absorbing-liquid component concentration of the cooler-condensate liquid 9, into which the compression-condensate liquid 10 has been mixed, can be made lower. Thus, in the regeneration tower cleaning unit 80, the absorbing liquid component entrained with the regeneration unit exhaust gas 8 can be efficiently captured upon cleaning. As a result, the efficiency of capturing the absorbing liquid component in the regeneration unit exhaust gas 8 can be improved.

In the above-described embodiment, the first compression-condensate-liquid line 101 is coupled to the cooler-condensate liquid line 49, by way of example. However, the first compression-condensate-liquid line 101 may be coupled not only to the cooler-condensate liquid line 49 but also to at least one of the first circulation line 64 of the first absorption-tower cleaning unit 60 and the second circulation line 74 of the second absorption-tower cleaning unit 70. In this case, the compression-condensate liquid 10 can be mixed not only to the cooler-condensate liquid 9 but also to the first absorption-tower cleaning liquid 11 and/or the second absorption-tower cleaning liquid 12, whereby the efficiency of capturing the absorbing liquid component in the absorption-unit exhaust gas 3 and the regeneration unit exhaust gas 8 can be improved.

In addition, in the above-described embodiment, at least one of the heating liquid 6a from the reboiler 42, the desalinated condensate liquid 16 from the desalination tower 107 and the exhaust-gas condensate liquid 17 from the exhaust-gas cooling tower 108 may be mixed into the compression-condensate liquid 10 by the refill-liquid supply unit 106.

In addition, in the above-described embodiment, the cooler-condensate liquid 9 having cleaned the regeneration unit exhaust gas 8 in the regeneration tower capturing unit 81 of the regeneration tower cleaning unit 80 flows down from the regeneration tower capturing unit 81 so as to be supplied to the regeneration unit 31, by way of example. However, not limited thereto, the regeneration tower cleaning unit 80 may include a storage unit such as the first cleaning-liquid storage unit 63 shown in FIG. 1 and a circulation line (not shown) such as the first circulation line 64, so as to circulate the cooler-condensate liquid 9. In this case, since the compression-condensate liquid 10 is mixed into the cooler-condensate liquid 9, a liquid amount of the cooler-condensate liquid 9 can be increased.

In addition, in the above-described embodiment, another cleaning unit (not shown) may be disposed above the regeneration tower cleaning unit 80, so that the regeneration unit exhaust gas 8, which has been cleaned in the regeneration tower cleaning unit 80, may be further cleaned in the other cleaning unit. In this case, the absorbing liquid component entrained with the regeneration unit exhaust gas 8 can be further captured.

According to the above-described embodiments, the effect of capturing the absorbing liquid component in the absorption-unit exhaust gas or the regeneration unit exhaust gas can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Further, it will be understood that these embodiments can be at least partially combined properly without departing from the spirit of the present invention.

The invention claimed is:

1. An acid-gas capturing apparatus comprising:
   an absorption unit configured to cause an acid gas contained in a plant exhaust gas to be absorbed by an absorbing liquid, and to discharge the plant exhaust gas as an absorption-unit exhaust gas;
   a regeneration unit configured to cause the acid gas to be released from the absorbing liquid having absorbed the acid gas in the absorption unit, and to discharge the acid gas as a regeneration unit exhaust gas;
   a compression unit configured to compress the regeneration unit exhaust gas; and
   a first cleaning unit configured to clean the absorption-unit exhaust gas or the regeneration unit exhaust gas before it is compressed by the compression unit, by means of a first cleaning liquid;
   a first compression-condensate-liquid line whose one end is connected to the compression unit, the first compression-condensate-liquid line being configured to mix a compression-condensate liquid, which is generated by the compression of the regeneration unit exhaust gas in the compression unit, into the first cleaning liquid,
   wherein the first compression-condensate-liquid line comprises a decompression unit configured to decompress the compression-condensate liquid, and a diluent supply unit disposed between the compression unit and the decompression unit, the diluent supply unit being configured to mix a diluent for diluting the compression-condensate liquid into the compression-condensate liquid; and
   a gas return line configured to mix a condensate liquid gas, which is generated in the decompression unit upon decompression of the compression-condensate liquid, into the regeneration unit exhaust gas.

2. The acid-gas capturing apparatus according to claim 1, further comprising a reboiler configured to heat the absorbing liquid in the regeneration unit by means of a heating medium,
   wherein the heating medium having heated the absorbing liquid is mixed into the first cleaning liquid.

3. The acid-gas capturing apparatus according to claim 1, further comprising an exhaust-gas treatment unit configured to treat the plant exhaust gas before it is supplied to the absorption unit, and to discharge a treatment-unit discharge liquid,
   wherein the treatment-unit discharge liquid discharged from the exhaust-gas treatment unit is mixed into the first cleaning liquid.

4. The acid-gas capturing apparatus according to claim 1, wherein
   the first cleaning unit is configured to clean the absorption-unit exhaust gas, and
   the acid-gas capturing apparatus further comprises a second cleaning unit configured to clean the absorption-unit exhaust gas before it is cleaned by the first cleaning unit, or the absorption-unit exhaust gas that has been cleaned by the first cleaning unit, by means of a second cleaning liquid.

* * * * *